UNITED STATES PATENT OFFICE.

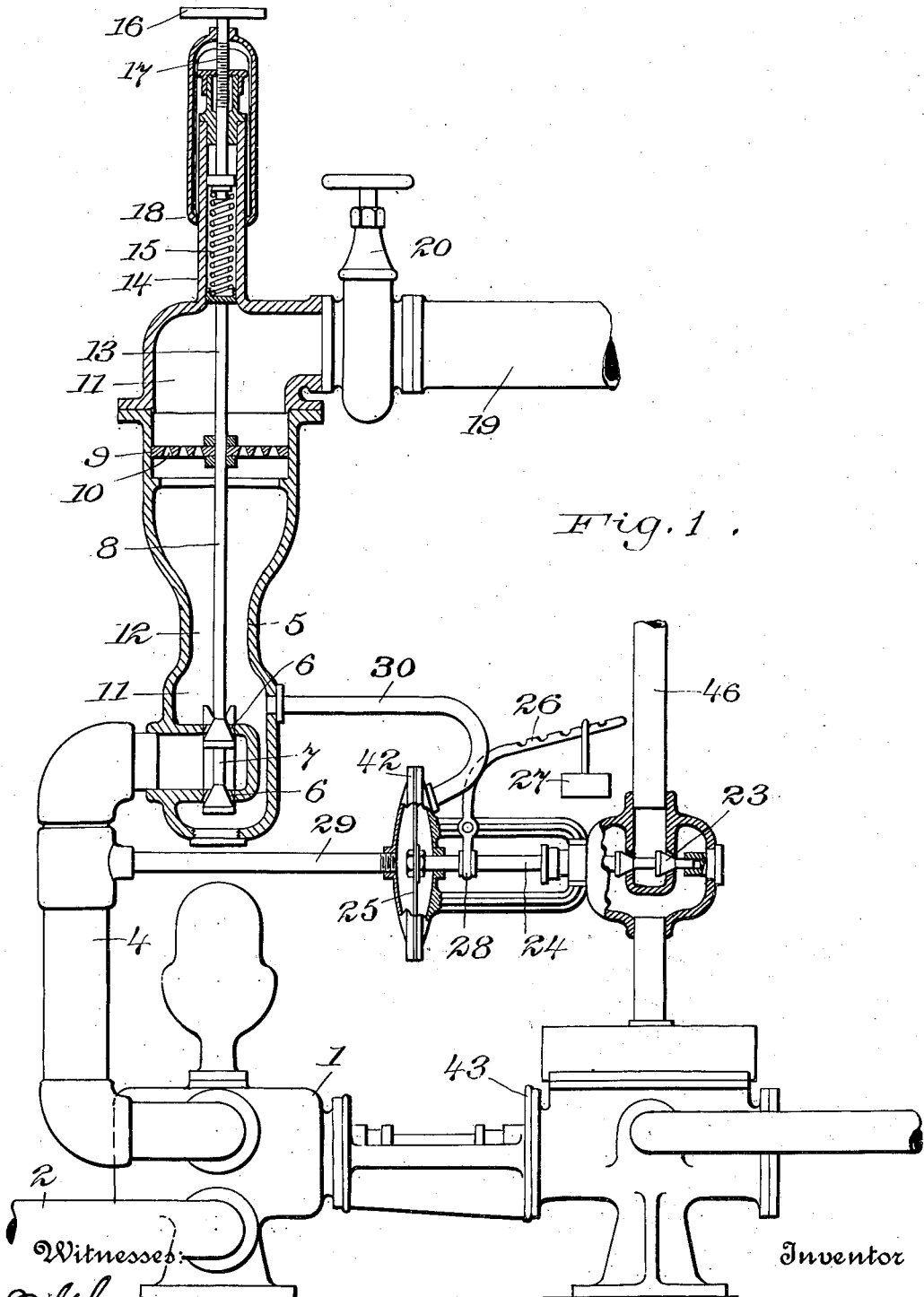

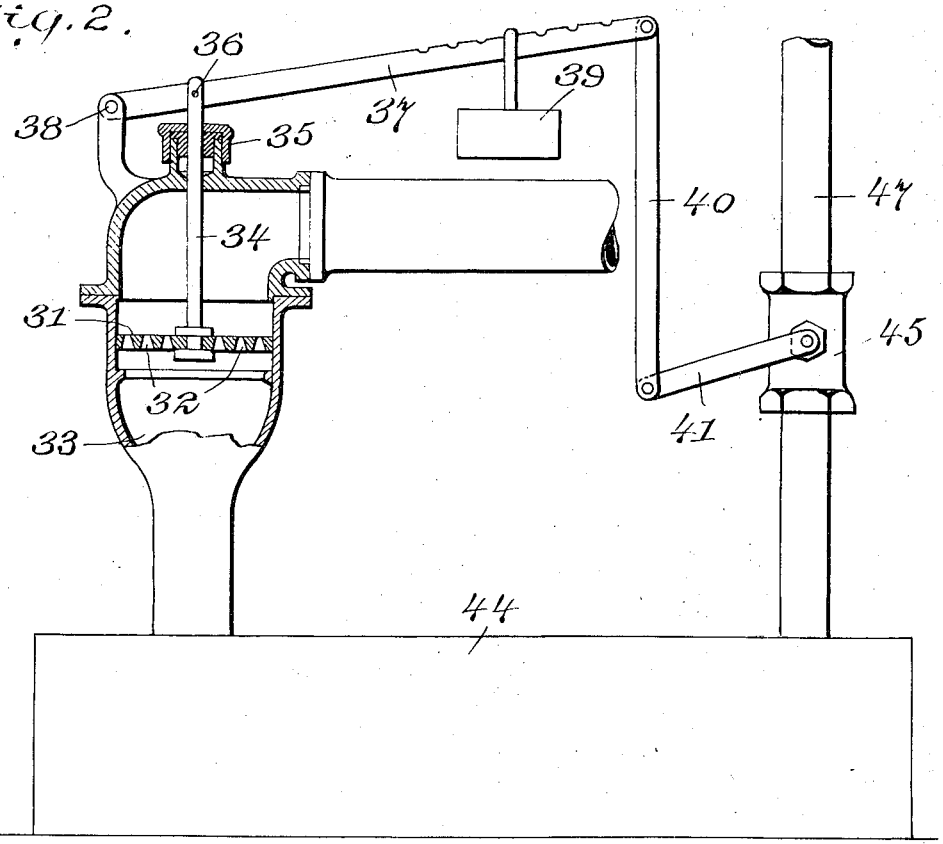
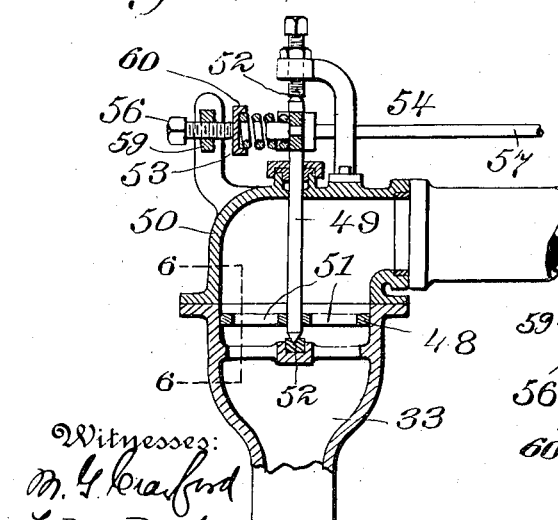
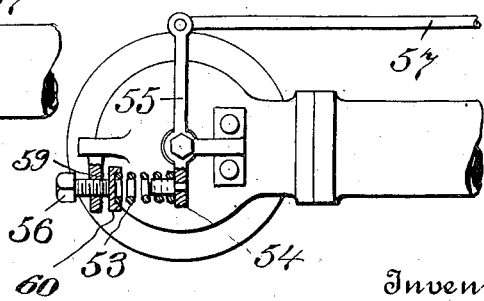

WILLIAM F. TRAUDT, OF RUTHERFORD, NEW JERSEY.

AUTOMATIC LIQUID-FLOW REGULATOR.

1,279,613.

Specification of Letters Patent. Patented Sept. 24, 1918.

Application filed August 28, 1914. Serial No. 859,107.

*To all whom it may concern:*

Be it known that I, WILLIAM F. TRAUDT, a citizen of the United States of America, residing at Rutherford, county of Bergen, State of New Jersey, have invented certain new and useful Improvements in Automatic Liquid-Flow Regulators, of which the following is a specification.

My invention relates to apparatus for controlling the flow of liquids and comprises devices for producing or maintaining automatically a uniform rate of flow of a liquid *i. e.* the delivery of a constant volume thereof per unit of time, independently of variations of pressure at the source of flow, or at the delivery point, or of other changes in the load on the pump. To this end the invention consists primarily of a self-acting throttling device by which a body of liquid flowing through a conduit automatically, by its own velocity, adjusts a throttle valve, or other controlling device, so that a uniform rate of flow results. This may be accomplished by throttling the flow of liquid itself, or by varying the supply of energy to the pump producing said flow. In addition to and in connection with this primary feature, my invention also includes special improved means of great sensitiveness in action for thus automatically throttling or otherwise regulating the energy supplied to the pump and so avoiding unnecessary waste thereof.

The present invention, while not in anywise limited in its application, is specially adapted for use in the process of brewing, in which the beer, contained in vats or tanks, is drawn therefrom by means of a pump and delivered to one or more filters, which operate at the greatest efficiency when the supply of liquid is constant and of uniform volume. As the containing vats or tanks are ordinarily located on different floor levels, the load on the pump changes from time to time as the supply is drawn from different levels, this causing the material variation in the rate of supply to the filters unless some means of regulation are employed. This difficulty, I find, is entirely overcome by the employment of my improved flow regulator in connection with such a system.

The accompanying drawings will serve to illustrate several forms of apparatus suitable for carrying my invention into effect, which are the best forms at present known to me. I wish it understood, however, that I do not limit myself to either the exact forms or details of construction shown, as various changes may be made therein without departing from the spirit and scope of the present invention.

In the drawings,

Figure 1 shows the application of the invention to a reciprocating pump and illustrates as an additional feature, a means for producing automatic regulation of the steam supply to the pump.

Fig. 2 shows a modified apparatus by which the throttling of the liquid supply, or of the energy for the pump delivering such liquid supply, may be effected.

Fig. 3 shows a further modification of such apparatus.

Fig. 4 is a top plan view of the same, and

Fig. 5 is a detail cross section on line 6—6 of Fig. 3.

Referring now to the drawings, in which like reference characters indicate like parts, 1, represents a pump. The pump, as shown, is arranged to discharge through a pipe 4, into a conduit 5, inlet to which is provided by way of ports 6, 6. Controlling the inlet ports 6, 6, there is a balanced throttle valve 7, the stem 8 of which carries a perforated diaphragm 9, fast thereon. The diaphragm has a series of perforations 10, formed in it and is mounted in one of the enlarged end sections 11, 11, of the conduit 5, the mid-section 12, of which is somewhat reduced in diameter. That portion 13, of the valve stem extending beyond the diaphragm serves as a piston rod, which is adapted to telescope into a pocket or tubular extension 14, from the conduit, and press against a spring 15, seated therein. The tension of the spring 15, is adjustable by turning the hand wheel 16, of an adjusting screw 17. An index, represented by the yoke and ring 18, serves as a guide in setting the hand wheel for various rates of flow.

Outlet from the conduit is by way of a pipe 19, controlled by a valve 20, and leading through suitable connections, to one or more receptacles or receiving vessels, such for example as filters or vats of the type employed in the brewing process.

The operation of the apparatus, thus far described, is as follows: On starting the pump 1, beer or other liquid drawn from one or more of the vats, tanks or other suitable sources of liquid supply, is forced into the conduit 5, to which there is free entrance by way of the inlet ports for the first rush of liquid, the spring 15, tending to maintain the valve 7, wide open, while the conduit is empty. The expansion of spring 15, is limited only by the striking of diaphragm 9, against the shoulder of smaller conduit section 12. The liquid entering the conduit 5, finds its only outlet through the perforations 10, in the diaphragm 9, and, discharging through such perforations, exerts more or less pressure on the diaphragm depending upon the velocity of the liquid passing through.

As the velocity increases, the increased pressure on the yielding member, the perforated diaphragm 9, in the path of the current, tends to move said yielding member forward, compressing spring 15, and gradually closes the throttle valve 7, until the throttling action of said valve prevents further increase of velocity of flow at the existing pump pressure. Thereafter the parts remain in substantial equilibrium and the rate of flow is held uniformly at a degree determined by the adjustment of spring 15. If the load on the pump is decreased, as by the supply connection being shifted from one vat to a higher one, and the liquid is therefore delivered to pump discharge pipe 4, at a higher pressure, which tends to increase the velocity of discharge, the initial acceleration of flow through conduit 5, moves yielding member 9, slightly forward, further closing the throttle valve 7. As a result, the higher pressure in pipe 4, can force only the predetermined quantity of liquid per second through the reduced opening of the throttle valve 7, and the uniform rate of flow is maintained. Conversely, if the load on the pump is increased by shifting its source of supply back to the lower vat again, the initial slowing down action resulting causes the perforated diaphragm 9, to move toward the throttle valve, and increase the opening thereof, so that the lower pump pressure can still deliver the uniform volume of liquid per second through the larger opening of the throttle valve 7. In other words the throttling action of valve 7, is a variable dead resistance which is always added to the useful work to be done by the pump. The yielding member acted on by the current in conduit 5, automatically changes this variable throttling resistance to compensate for variations in the useful load, so that the sum total of load carried, or work to be done, by the pump is constant, and consequently its speed is constant, and the volume of liquid delivered per unit of time by the pump (i. e. the rate of flow of the pumped liquid) remains constant and uniform. This uniformity would be similarly maintained if the absolute head against which the pump had to work were also varied, as when beer had to be delivered at different periods to filter presses or vats at different levels. The rate of flow can be adjusted, within the limits of the pump's capacity, by varying the tension of spring 15.

As a means of facilitating the regulation of the flow and at the same time economizing in the consumption of steam or other form of energy consumed by the pump, I have illustrated in Fig. 1 of the drawings, an improved regulating device for the steam throttle valve 23, in the steam supply pipe 46, of the pump.

As shown, the valve 23, preferably of the balanced type, has its stem 24, connected with the flexible diaphragm 25, of the differential regulator 42. A pivoted lever 26, carrying an adjustable weight 27, at one end, has its opposite end 28, forked to coöperate in the usual manner with the valve stem, to draw the valve away from its seat and open the inlet for the admission of steam to the steam cylinder of the pump 43. Opposing this action of the weighted lever, there is a liquid pressure connection shown in the form of a pipe 29, extending from the discharge pipe 4, of the pump to the pressure chamber formed at the left hand side of the diaphragm, or the side opposite that to which the steam valve stem is attached. I also employ in this form of differential regulator an additional liquid pressure connection, i. e., one between the conduit 5, and the pressure chamber formed at the right hand side of the regulator diaphragm, the same being shown as a pipe 30. Thus arranged, the difference in pressure in the connections 29, and 30, would operate to overcome the thrust of the counterweight, which would be adjusted empirically to overcome the resistance of moving parts, and a given difference of pressure existing in pipe 4, and conduit 5, and produce the desired sensitiveness of regulation. The employment of the connection 30, renders the regulator more sensitive to variations of pressure on either side of valve 7, and also takes much of the work burden off of the weighted lever system.

The operation of this automatic regulator of energy is as follows: When the pump is called upon to operate under a light load, as when the source of the liquid supply is shifted to a higher level, there is a tendency of course for the pump to speed up. The initial increase of velocity of delivery acts on the flow regulator to partially close the liquid throttle valve 7, and corrects this tendency toward increasing the rate of delivery, as before described. The result is an increase of pressure in discharge pipe 4, necessary to force the same volume of liquid per unit of time through the smaller opening of throttle valve 7. If no further regulation were attempted the pump would continue operating against this unnecessarily high pressure, wasting a portion of the energy in forcing the predetermined volume of liquid through the throttle valve 7. With the arrangement shown in Fig. 1, however, this increased pressure in pipe 4, is transmitted through pipe 29, to diaphragm 25, forcing it to the right against the constant pressure in pipe 30, and that of the weighted lever system 26, 27, 28. This partially closes steam throttle valve 23, and cuts down the consumption of steam. This tends to slow the pump, and the initial decrease in velocity of delivered liquid again acts on the flow regulator to reopen liquid throttle valve 7, and reduce the difference between the pressures on the two sides of the valve. Soon a condition of equilibrium is reached, determined largely by the position of weight 27, on lever arm 26, and the apparatus then continues delivering the predetermined volume of liquid per unit of time through the opened throttle 7, with the least consumption of steam necessary to do the useful work required, the dead resistance of liquid throttling at valve 7, having been eliminated, and no more energy being consumed in overcoming this internal resistance. If, on the other hand, the reduction in load on the pump results from the point of delivery of the liquid being shifted to a lower level, or to other causes creating a lower pressure in conduit 5, this reduction in pressure is transmitted through pipe 30, to the pressure chamber on the right hand side of diaphragm 25, and the same partial closure of steam throttle 23, results. When the load is increased for any reason, the reverse of the above described operations, or of one of them occurs, and the supply of steam is increased to the extent necessary to maintain a uniform rate of flow of the delivery.

In Fig. 2 I have illustrated different forms of connecting mechanism for transmitting motion from the perforated diaphragm, or other yielding member to a throttle valve, which may be either the liquid throttle valve or the steam throttle valve 45, of the pipe 47, leading to the pump represented diagrammatically by the rectangle 44.

As shown, the device comprises the same form of movable, perforated diaphragm 31, having perforations 32, therein, and mounted in an enlarged section of the conduit 33. The piston rod 34, extending through a stuffing box 35, is suitably connected at 36, with a lever 37, pivoted at 38, and carrying an adjustable weight 39. Lever 37, is connected by link 40, to handle 41, of the steam throttle.

From the foregoing description, the operation of the device will be apparent. Any increase in the discharge flow from the pump developing sufficient increase of velocity in conduit 33, to move the perforated diaphragm 31, will result in such movement being transmitted through the lever connections described, to rotate the steam valve and cut down the amount of energy delivered to the pump. Similarly, if the rectangle 44, be assumed to represent merely a conduit or pipe connecting pipe 47, with conduit 33, and the liquid to be delivered at a uniform rate flows through these pipes and conduits from some source of supply, not shown, the apparatus illustrated would then operate valve 45, as a liquid throttle, and regulate the flow of liquid at a uniform rate, as before described.

In Figs. 3 to 5, a further modification is illustrated in which a rotatable perforated disk or diaphragm is substituted for the perforated diaphragm having a motion of translation, previously described.

In this form, a disk 48, is mounted fast on a rotatable shaft 49, in an enlarged section 50, of the conduit 33, and has perforations 51, therein inclined or cut at an angle to the line of flow of the liquid. The shaft 49, turns on cone bearings 52, 52, one of which is located interiorly and the other exteriorly of the conduit. Yieldingly opposing any rotation of the disk which would be given it in one direction by the flow of the liquid, there is a spring 53, acting against the short arm 54, of a lever 55, fast on the disk shaft, the tension of the spring being adjustable by means of a set screw 56 mounted in housing 59 and bearing on cup 60, which serves as a point of support for one end of spring 53. Connection from the long arm of the lever, as indicated by the rod 57, may be made in any suitable manner with a steam throttle valve, liquid throttle valve, rheostat or other device to be governed, so as to regulate the flow of liquid in any of the ways hereinbefore described.

The principle of operation of the form last described does not differ from that of the other forms, the only change being in structure, which results in giving the yielding member of the regulator rotary instead of reciprocating motion.

Among the many important advantages of my invention, attention is called to its compact and simple form, the sensitive, automatic regulation of the discharge of liquid, and the automatic regulation of the energy consumed by the pump, so as to avoid any waste thereof.

As I have stated above, structural changes can be made in the several features disclosed without departing from the underlying principle of my invention. Other devices suitable for checking the flow of liquid and controlling the valve might be employed as a substitute for the perforated diaphragm shown. Valves of various types could be used and governed by other yielding means than a diaphragm interposed in the line of flow of the liquid, but all such changes I consider merely modifications of my invention and have not, therefore, illustrated or described the same in detail.

Having, therefore, described my invention, I claim:

1. The combination of a conduit, a pump having its discharge port connected to said conduit, a balanced throttle valve controlling the connection between the pump and the conduit, and means located in the conduit tending to close said throttle valve when the velocity of flow therethrough increases, and to open the valve wider when the velocity decreases, together with mechanism for controlling the supply of energy to the pump and a differential regulator for said mechanism connected to the conduit and to the connection between pump and throttle valve.

2. The combination of a conduit, a pump having its discharge port connected to said conduit, a balanced throttle valve controlling the connection between the pump and the conduit, and means located in the conduit tending to close said throttle valve when the velocity of flow therethrough increases, and to open the valve wider when the velocity decreases, together with mechanism for controlling the supply of energy to said pump, a pressure chamber, a flexible diaphragm therein, a connection from said diaphragm to said mechanism, and a pipe from the pressure chamber to the connection between the pump and the throttle valve.

3. The combination of a conduit, a steam pump having its discharge pipe connected to said conduit, a balanced throttle valve controlling the connection between said discharge pipe and the conduit, means located in the conduit adapted to regulate the closing of said throttle valve proportionally to the velocity of flow in the conduit, a throttle valve in the steam pipe to the pump, and a differential regulator connected to said steam throttle, to the conduit and to the pump discharge pipe.

WILLIAM F. TRAUDT.

Witnesses:
LAWRENCE McMAHON,
M. G. CRAWFORD.